United States Patent [19]

Catcher

[11] Patent Number: 4,653,791

[45] Date of Patent: Mar. 31, 1987

[54] CLAM DIGGER

[76] Inventor: Mikie B. Catcher, 1515 Weaver St., Scarsdale, N.Y. 10583

[21] Appl. No.: 779,220

[22] Filed: Sep. 23, 1985

Related U.S. Application Data

[63] Continuation-in-part of Ser. No. 605,069, Apr. 30, 1984, abandoned.

[51] Int. Cl.$^4$ .............................................. A01B 1/00
[52] U.S. Cl. ................................... 294/50.5; 294/50.7
[58] Field of Search ..................... 294/50, 50.5–50.7, 294/58, 64 R; 37/55, 119; 73/864.44, 864.54; 92/175, 205, 240–243, 250–253, 257, 258; 172/22; 175/20; 4/255–257; 277/208; 417/544; D23/14–16

[56] References Cited

U.S. PATENT DOCUMENTS

| | | | |
|---|---|---|---|
| 174,280 | 2/1876 | Mooney | 294/64.1 X |
| 554,139 | 2/1896 | Ober | 294/50.5 |
| 944,393 | 12/1909 | Whitney | 294/50.5 |
| 1,684,880 | 9/1928 | Norton | 4/255 |
| 1,783,026 | 11/1930 | Ober | 294/50.7 X |
| 2,274,304 | 2/1942 | Perry | 294/64.1 X |
| 2,388,422 | 11/1945 | Krastel | 92/257 X |
| 2,802,689 | 8/1957 | Batstone | 294/50.7 |
| 3,089,721 | 5/1963 | Puckett | 294/50.7 |
| 3,123,391 | 3/1964 | Novak | 294/50.7 |
| 3,144,256 | 8/1964 | Wright | 92/242 X |
| 3,273,930 | 9/1966 | Gottfried | 294/50.7 X |
| 3,934,280 | 1/1976 | Tancredi | 4/255 |
| 4,244,614 | 1/1981 | Madsen | 294/50.7 |

FOREIGN PATENT DOCUMENTS

| | | | |
|---|---|---|---|
| 1047641 | 12/1958 | Fed. Rep. of Germany | 92/242 |
| 296139 | 8/1928 | United Kingdom | 294/50.7 |
| 354990 | 8/1931 | United Kingdom | 294/50.5 |
| 419556 | 11/1934 | United Kingdom | 92/243 |

OTHER PUBLICATIONS

Ecology Magazine, vol. 37, No. 3, pp. 611–613, Jul., 1956, "A Piston Sampler for Surface Sediments of Lake Deposits" by Seward R. Brown.

Primary Examiner—Johnny D. Cherry
Attorney, Agent, or Firm—Baker, Maxham & Jester

[57] ABSTRACT

An apparatus for digging clams, bait or other items includes an elongated cylindrical barrel with a piston reciprocably mounted on one end of an elongated plunger rod extending into the barrel and having a handle on the outer end thereof. A handle extends outward from the upper end of the barrel to permit manipulation of the apparatus.

1 Claim, 4 Drawing Figures

U.S. Patent  Mar. 31, 1987  4,653,791
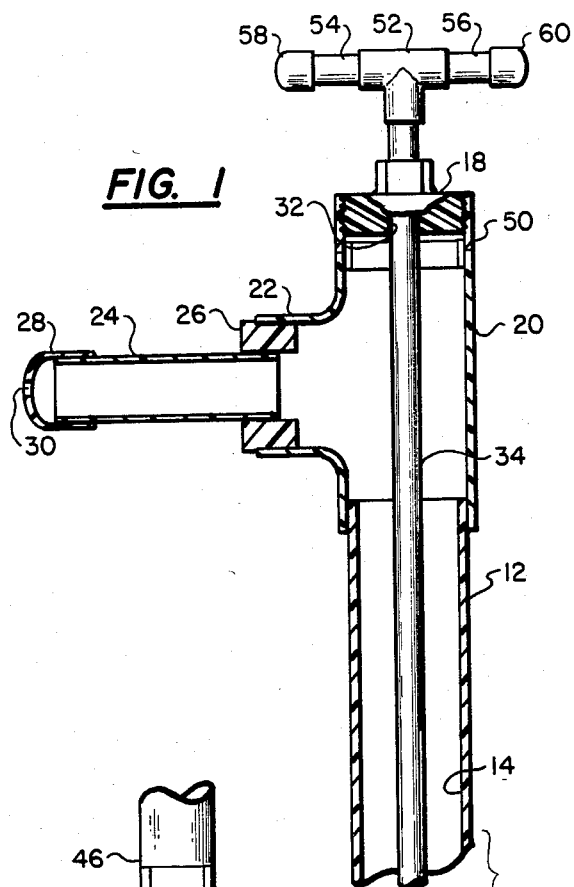
FIG. 1
FIG. 4
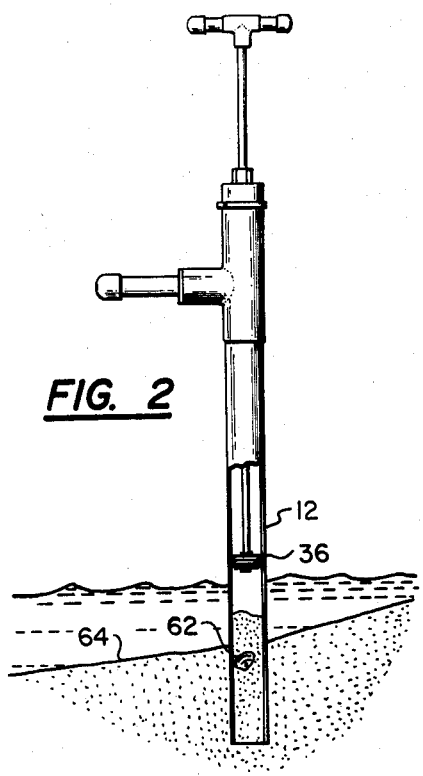
FIG. 2
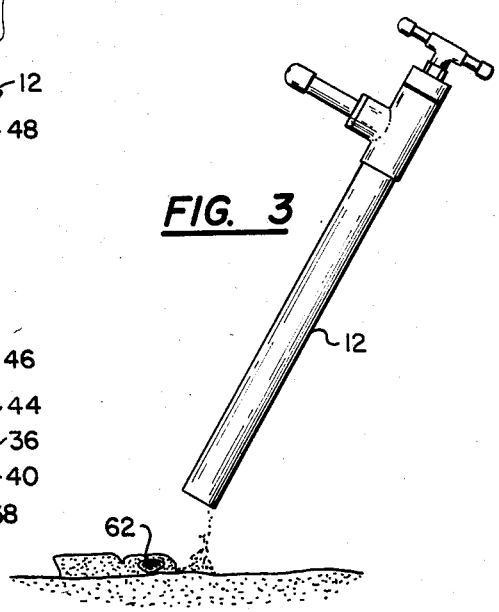
FIG. 3

CLAM DIGGER

This is a continuation-in-part of copending application Ser. No. 605,069 filed on Apr. 30, 1984, now abandoned.

REFERENCE TO RELATED APPLICATION

This application is a substitute for my application Ser. No. 251,346, filed Apr. 6, 1981, entitled "Clam Digger", now abandoned.

BACKGROUND OF THE INVENTION

The present invention relates to a digging apparatus and pertains particularly to an apparatus for digging clams and the like.

The digging of clams, bait, and the like is normally carried out by means of a shovel and a bucket. A shovel is normally satisfactory for digging clams and certain items but is unsatisfactory for digging of certain other items such as blood worms and the like for bait. The digging of worms with a shovel frequently results in the worms being cut or chopped up without recovering the entire worm.

Clam digging devices have been proposed in the past wherein a cylindrical barrel having an open end for forcing into the sand is provided with a closed end with a closable vent hole for establishing a vacuum when being withdrawn. Exemplary of these devices are illustrated in the following U.S. Pat. Nos.: 2,802,689, issued Aug. 13, 1957 to Batstone; 3,089,721, issued May 14, 1963 to Puckett; and 4,244,614, issued Jan. 13, 1981. These have been satisfactory in many instances. However, improvements in construction and operation are desirable.

SUMMARY AND OBJECTS OF THE INVENTION

It is the primary object of the present invention to provide an improved clam and bait digging apparatus.

In accordance with the primary aspect of the present invention, a clam and bait digging apparatus includes an elongated tubular barrel having a lower open end and an upper closed end with a plunger having a piston reciprocably mounted within the barrel and extending from the upper end with a handle on the upper end of the plunger for moving the piston within the barrel.

BRIEF DESCRIPTION OF THE DRAWINGS

The above and other objects and advantages of the present invention will become apparent from the following description when read in conjunction with the drawings wherein:

FIG. 1 is a side elevation view in section of a preferred embodiment of the invention;

FIG. 2 is a side elevation view partially in section of the embodiment of FIG. 1 shown in use;

FIG. 3 is a side elevation view of the apparatus showing a further stage of use; and FIG. 4 is a detailed view of the piston assembly.

DETAILED DESCRIPTION OF A PREFERRED EMBODIMENT

Turning to the drawings, there is illustrated a digging apparatus in accordance with the invention. The apparatus in its preferred embodiment comprises an elongated, cylindrical tubular barrel 12 having a cylindrical bore 14 with an open lower end 16 and an upper end closed by means of a removeable plug of cap 18. The plug 18 is threadably mounted in the upper end of the barrel for ease of removal to permit removal of the plunger assembly for cleaning, adjustment, or repair. The barrel is preferably on the order of about 2 to 4 inches in diameter and constructed of off the shelf materials, such as a light plastic pipe material such as PVC schedule 40 or the like. This provides a lightweight, high-strength, durable device that is non-corrosive.

In the preferred construction, the barrel has an upper extension comprising a T-joint member 20 having its two arms oriented coaxially of the barrel and with a leg 22 extending outward at 90 degrees thereto and including a tubular extension 24 defining a handle. The handle 24 is of smaller diameter than the leg 22 of the T-joint, and is fitted by a reducer 26 and includes a cap 28 on the outer end in which is a formed vent opening or port 30 for venting the barrel above the piston.

The cap 18 is preferably formed of a male reducer, and includes a central bore 32 in which is reciprocably mounted a plunger rod 34 with a piston 36 secured to the lower end thereof and sealingly engaging the inner wall or bore 14 of the barrel. The piston 36 is preferably constructed of neoprene rubber, and preferably in the form of a cylindrical washer or doughnut shaped member having a generally cylindrical outer surface with a plurality of spaced apart annular ring-like ridges. The piston 36 is mounted on a threaded nylon shaft 38 between a first compression washer 40 on the lower end of the shaft, and a second washer 42 on the upper end thereof. A pair of washers 41 and 43 are mounted in recesses in the ends of piston 36 and are engaged by the compression washers 40 and 42. A nylon nut 44 threadably engages the shaft 38 and is operative to move along the shaft for forcing the washer 42 tighter into engagement with the piston member 36 for forcing it to bulge outward in a radial direction for tighter engagement with the bore 14 of the barrel 16. Thus, the sealing of the piston 36 within the bore of the barrel can be adjusted to a certain extent.

This adjustment of the piston within the barrel is accomplished by means of the nylon nut 44, and pairs of washers 40, 41, and 42, 43 which are selectively adjusted to provide optimum sealing to obtain the desired amount of vacuum within the barrel, as will be explained. Movement of the nut 44 toward the head of the shaft 38 squeezes the piston 36 between the pairs of washers forcing it to expand radially into tighter engagement with the wall of the barrel.

The plunger 34 is preferably a plastic cylindrical member, which may also be tubular, and includes a suitable fitting 46 into which the shaft 38 is threaded. A stop member 48 is also mounted on the plunger rod 34 and spaced upward from the piston 36 a sufficient distance for engaging cap 18 and prevents the piston from extending beyond the main barrel 12 into the T-joint 20 during normal operation. This prevents the piston from breaking the seal in the barrel and prevents it from passing beyond or out of the main barrel section.

The upper end of the barrel is closed by a removable plug member 18, which, as previously explained, includes a cylindrical bore 32 in which the plunger rod 34 is mounted. This plug 18 may be threadably mounted directly in the arm of the T-joint 20. This enables removal of the plunger and piston for cleaning or replacement. The T-joint extension 50 is attached on the upper end of the barrel so as not to present any obstruction to removal of the piston and plunger through the top of the barrel.

A handle is secured to the upper end of the plunger rod 34 and includes a T-member 52 having the leg portion thereof connected directly to the upper end of the plunger rod 34, and the arms thereof extending outward at right angles thereto. The handle preferably includes extensions 54 and 56 extending outward therefrom and each includes a cap 58 and 60, respectively, thereof.

The main components, as previously described, are preferably made of available materials such as PVC pipe and may be secured together either by a threaded connection or by gluing. Preferably, the plug member 18 is secured in position by threadably engaging the extension 50 with the remainder of the joints in the assembly, preferably formed by gluing the various members or components together. This provides a very high strength, lightweight, durable clam digging apparatus.

The apparatus, as previously explained, can be utilized for clam digging or bait digging and the like. The apparatus is best suited for digging in wet or water logged soil or sand. In digging for an object, the object, such as a clam or the like, 62, is first located beneath the surface 64 of the beach or the like and the lower end 16 of the barrel 12 is placed directly above the object with the plunger in its lower most position. The lower end of the barrel is then sealed against the surface of the ground and the plunger then pulled upward so that a vacuum is formed below the piston 36 forcing the barrel downward, forcing soil and the object 62 into the barrel. Once the barrel has penetrated sufficiently to secure the object within the barrel, the barrel is then removed from the soil or ground, with the plunger kept in its upper most position maintaining a vacuum above the accumulated soil or sand and object within the barrel. The barrel is raised to a position above the surface of the ground where the plunger is then forced back downward, forcing the article or object 62 and the accumulated material from the end of the barrel. The clam or other article 62 can then be retrieved.

While I have illustrated and described my invention by means of specific embodiments, it is to be understood that numerous changes and modifications may be made therein without departing from the spirit and scope of the invention as defined in the appended claims.

I claim:

1. A clam digging apparatus constructed of PVC tubing and fittings for digging in water logged soil for recovery of clams, said apparatus comprising in combination:

an elongated section of PVC tubing defining a cylindrical tubular barrel having a uniform diameter throughout its length, an upper end defined by a first PVC tubular T-joint member defined by a pair of coaxial arms and a leg at a right angle to said arms mounted on the end thereof with the arms of said first T-joint member being coaxial of said barrel and the leg of said first T-joint member being outward at a right angle to said barrel;

an annular reducer of plastic material having a central bore mounted in the outer end of said leg;

a removable PVC cap member threadably mounted in the upper end of said barrel and having a cylindrical bore therein;

a plunger reciprocally mounted in said barrel and comprising an elongated section of PVC tubing defining a plunger rod mounted in said cylindrical bore of said cap member for mounting a piston, said plunger rod having a portion of enlarged diameter intermediate its ends forming a first stop member, an annular second stop member mounted in one of said arms of said first T-joint member adjacent said cap member for abutting engagement with said first stop member to confine the movement of said piston to said barrel, a piston formed of neoprene rubber and having a generally cylindrical configuration with annular ridges around the outer surface thereof adjustably and sealingly engaging the interior wall of said barrel, each end of said piston being provided with a circular recess, a first pair of washers disposed on opposite ends of said piston for accommodation within a respective one of said recesses, a second pair of washers disposed on opposite ends of said piston for overlying engagement with a respective one of said first pair of washers, a threaded nylon shaft extending axially through said piston and said washers for connecting said piston to the end of said rod, a nylon nut mounted on said shaft for adjustment along said shaft for squeezing said piston between said washers for radially adjusting said piston, and said plunger rod extending through said cap member beyond the upper end of said barrel;

a first handle defined by a first tubular member having an inner end extending within said annular reducer central bore for mounting said first tubular member in the leg of said first T-joint member and extending out from the side of said barrel and including a cap on the outer end of said first tubular member having a vent opening for venting said barrel behind said piston; and a second handle defined by a second T-joint member mounted on the upper end of said plunger rod and having a pair of tubular members mounted in and extending outward from the arms thereof.

* * * * *